April 29, 1952 H. J. MEEKER 2,594,785
COMMINUTOR
Filed Feb. 21, 1947 3 Sheets-Sheet 1
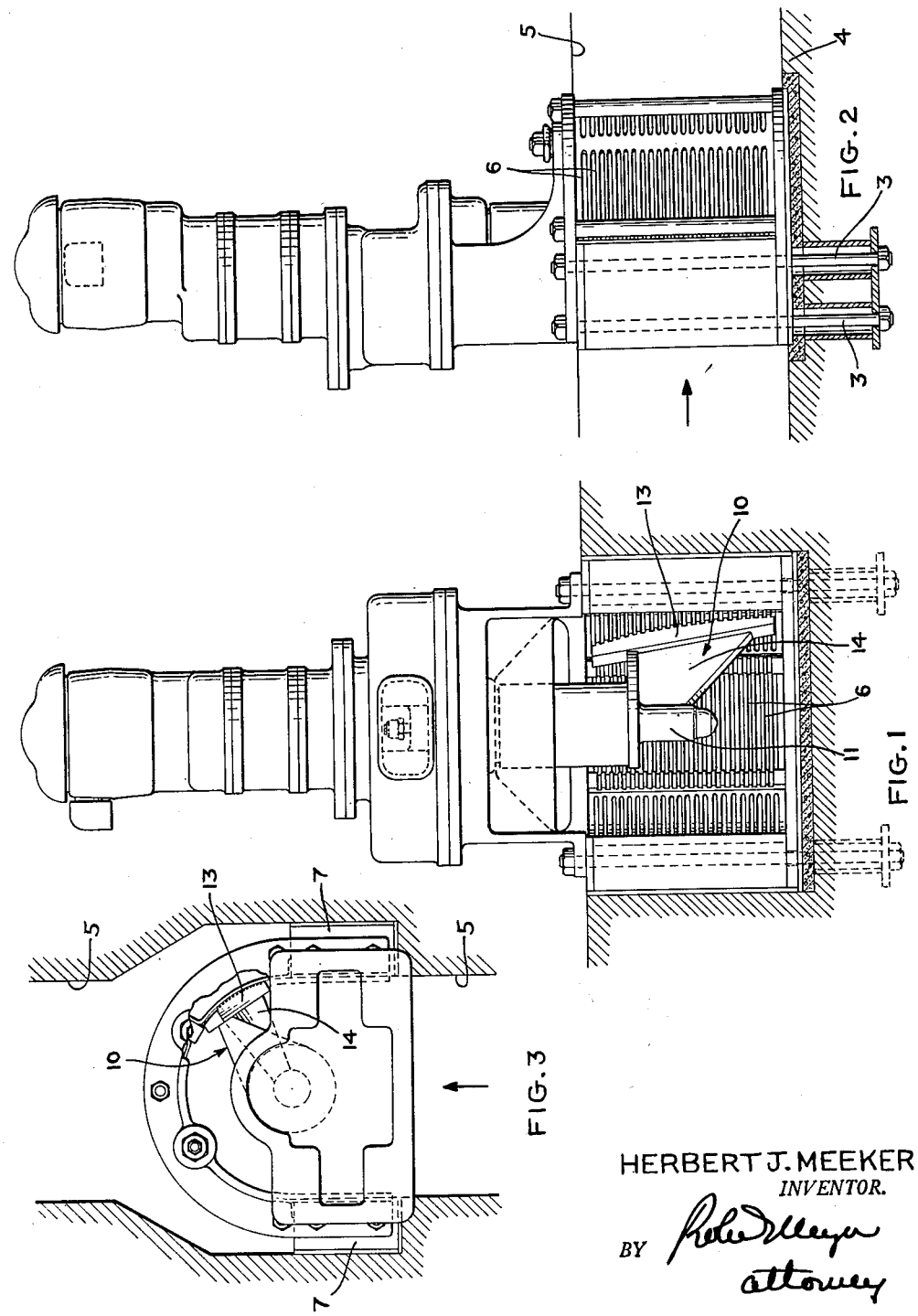
HERBERT J. MEEKER
INVENTOR.
BY [signature]
attorney

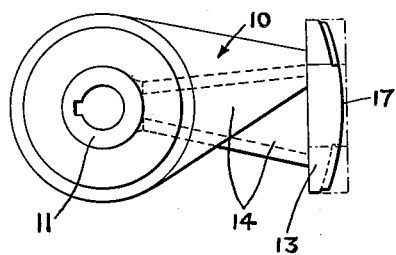
FIG. 7
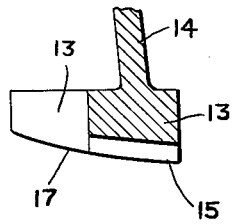
FIG. 9·A
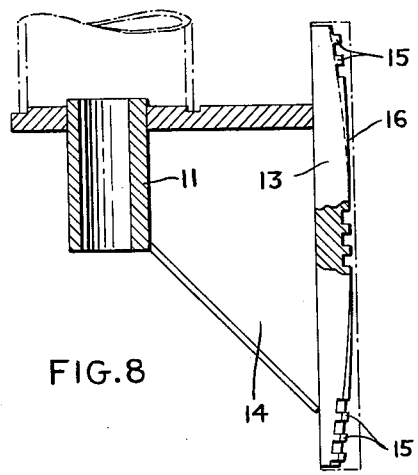
FIG. 8
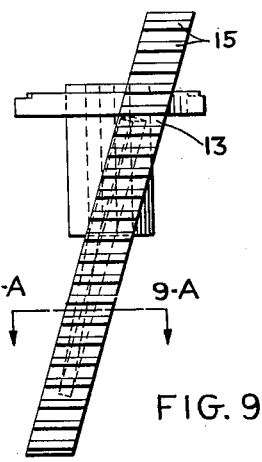
FIG. 9
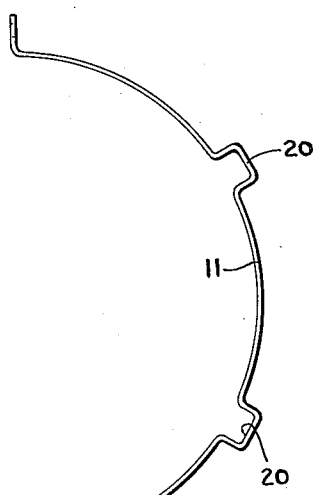
FIG. 10
HERBERT J. MEEKER
*INVENTOR.*

April 29, 1952   H. J. MEEKER   2,594,785
COMMINUTOR
Filed Feb. 21, 1947   3 Sheets-Sheet 3
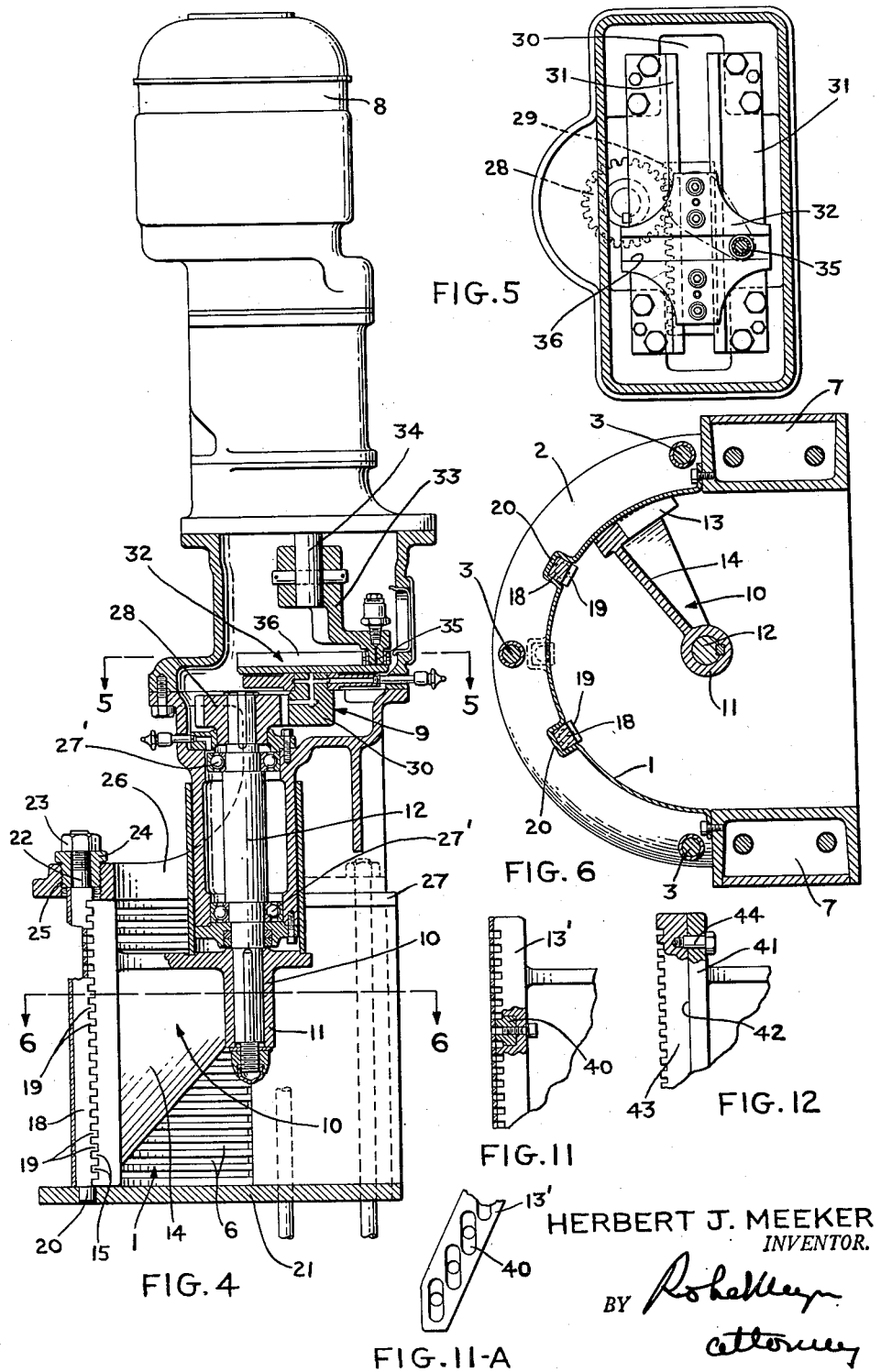
HERBERT J. MEEKER
INVENTOR.

Patented Apr. 29, 1952

2,594,785

UNITED STATES PATENT OFFICE 2,594,785

COMMINUTOR

Herbert J. Meeker, Orange, N. J., assignor to Worthington Pump and Machinery Corporation, Harrison, N. J., a corporation of Delaware Application February 21, 1947, Serial No. 730,116

5 Claims. (Cl. 210—152)

This invention relates to a comminutor which is a simple self-contained pre-treatment device for application to or at the inlet of both sewage pumping stations and sewage treatment plants for comminuting, that is, cutting and shredding foreign materials which comprise both floating and coarse suspended solids such as paper, rags, fruit skins, sticks, bones, domestic waste, etc., for reducing the size of such foreign material to permit its passage through the pumps of the sewage pumping station or through sewage treatment apparatus without clogging or affecting the operation thereof.

More specifically the present invention comprise a comminutor as specified, which consists mainly in a vertical stationary semi-cylindrical bar cage having a plurality of screening openings therein, such openings sized to permit the flow therethrough of foreign material of such size that it will not interfere with the operation of the sewage handling or treating apparatus; and further comprising in combination with the semi-cylindrical bar cage an internal oscillating cutter arm together with means for oscillating the cutter arm backwards and forwards over the concave side of the bar cage. The cutter arm carries shredding teeth which cooperate with shredding teeth removably carried by the bar cage to cut and shred collected screening of foreign material to such size as to permit it to pass through the screening openings in the semi-cylindrical bar cage.

An object of the invention is to provide a comminutor as specified which is relatively simple in construction, is self-contained and may be installed in a sewage channel at the inlet of a sewage pumping station or sewage pumping plant without requiring expensive special construction of the sewage channel, as well as a comminutor so constructed and designed that the shredding teeth or comb bars may be easily replaced when worn.

With these and other objects in view, as may appear from the accompanying specification, the invention consists of various features of construction and combination of parts, which will be first described in connection with the accompanying drawings, showing a comminutor of a preferred form embodying the invention, and the features forming the invention will be specifically pointed out in the claims.

In the drawings:

Figure 1 is a front elevation of the comminutor looking at the inlet thereof.

Figure 2 is a side elevation of the comminutor.

Figure 3 is a top plan of the comminutor with the motor removed.

Figure 4 is a vertical section through the comminutor.

Figure 5 is a horizontal section taken on the line 5—5 of Figure 4.

Figure 6 is a horizontal section through the comminutor taken on the line 6—6 of Figure 4.

Figure 7 is a top plan of the oscillating arm and cutter bar.

Figure 8 is a view partly in edge elevation and partly in section of the oscillating cutter bar.

Figure 9 is a view of the oscillating cutter bar in face elevation.

Figure 9A is a cross section taken on the line 9-A of Figure 9.

Figure 10 is a top plan of the semi-cylindrical bar cage.

Figure 11 is a fragmentary view partly in edge elevation and partly in section of a modified form of the oscillating cutter bar.

Figure 11A is a fragmentary face view of the modified form of cutter bar shown in Figure 11.

Figure 12 is a fragmentary view partly in edge elevation and partly in section of a further modified form of the oscillating cutter bar.

Referring more particularly to the drawings, the improved comminutor includes a semi-cylindrical bar cage 1 which is attached by means of a horizontal flange 2 and suitable anchoring bolts 3 to the bottom 4 of a channel 5 through which sewage flows either to a sewage pumping station or sewage treatment plant.

The semi-cylindrical bar cage 1 may either be cast of suitable metal or formed of sheet or bar metal of sufficient strength and rigidity and it is provided with a plurality of horizontally spaced slots 6. The semi-cylindrical bar cage 1 is placed with its open concave side facing the channel 5 so that sewage flowing to a pumping station or treatment plant (not shown) will have to pass through the semi-cylindrical bar cage.

Further anchoring of the bar cage in the channel 5 is provided by the columns 7 at each side of the channel 5, to which columns the ends of the cage 1 are attached. The columns 7 also provide supports for the motor 8 and the operating mechanism 9 which serves to oscillate the motor driven oscillating cutter arm structure 10.

The oscillating cutter bar structure 10 comprises a hub 11 which is keyed upon a shaft 12 for movement therewith and the cutter bar proper 13 is connected to the hub 11 by a suitable connecting web structure 14.

The cutter bar 13 extends vertically across the inner concave surface of the semi-cylindrical bar cage 1 at an acute angle, as clearly shown in Figures 1, 6 and 9 of the drawings. In the preferred form of the oscillating cutter bar structure the outer face of the cutter bar 13 is provided with a plurality of teeth 15 extending horizontally thereacross and spaced from one another, and since the cutter bar 13 extends diagonally to the perpendicular its outer surface is an inclined strip, forming a portion of a cylinder, as shown at 16 and 17 in Figures 8 and 7 of the drawings, so that during its oscillating movement it will move freely over the inner concave surface of the bar cage 1.

One or more toothed combs 18 is carried by the cylindrical bar cage 1. The combs 18 have a plurality of spaced teeth 19 along their inner surfaces and the combs are offset into suitable recesses 20 formed in the bar cage 1 so that their teeth 19 will mesh with the teeth 15 of the cutter bar 13 as the cutter bar moves over the combs so that the combined action of the teeth 15 and 19 will serve to cut and shred screenings of foreign material which collects against the concave surface of the bar cage 1. A progressive shearing action between the teeth 15 and 19 will be provided due to the angular disposing of the cutter bar 13 and the oscillating movement of the cutter bar structure 10 will serve to cut up the foreign material into particle sizes sufficient to pass through the slots 6 in the bar cage 1; that is, it will reduce the foreign material flowing with the sewage to such size that it may flow through the sewage apparatus (not shown) without interference therewith and be subsequently removed from the sewage by sedimentation.

The combs 18 are removably connected to the semi-cylindrical bar cage 1 by means of pins 20 on their lower ends which fit in suitable sockets in the base 21 of the bar cage and by means of threaded pins 22 on their upper ends which cooperate with nuts 23 to securely clamp the combs 18 in position. A sleeve 24 is threaded into an opening 25 in the support 26 which is attached to the top 27 of the semi-cylindrical bar cage 1 and the threaded pins or studs 22 extend through the sleeve 24. The sleeve 24 is of such diameter that when it is removed the comb 18 may be lifted vertically out of its recess 20 in the bar cage 1 for replacement or repair.

As previously stated, the oscillating arm structure 10 is keyed upon a vertical shaft 12 which is supported by suitable bearings 27' and has a gear or pinion 28 keyed upon its upper end. The pinion 28 meshes with the teeth 29 of a reciprocating rack 30. The rack 30 is supported for reciprocatory movement by suitable guides 31 and it has a Scotch yoke 32 attached to its upper surface. The Scotch yoke 32 is moved along the guides 31 by means of a crank arm 33 which is, in turn, pinned or otherwise suitably attached to the shaft 34 operated by the motor 8. The depending pin 35 on the crank arm 33 is mounted in the cross slot 36 of the Scotch yoke 32 so that when the motor 8 is operating and its shaft 34 is consequently rotated the Scotch yoke will be moved backwards and forwards along the guide 31, causing longitudinal movement of the rack 30 first in one direction and then in a reverse direction. The teeth of the rack 30 meshing with the pinion 28 will rotate the pinion first in one direction and then in the opposite direction causing a back and forth oscillating movement of the cutter bar 13 over the concave face of the bar cage 1 for comminuting the solid foreign matter in the sewage. Figure 11 shows a modified form of the oscillating cutter bar structure wherein the cutter bar 13' has a plurality of toothed carrying sections 40 removably and detachably carried thereby so that these sections can be removed for the purpose of replacement when the teeth become worn.

The modified form of the cutter bar shown in Figure 12 of the drawings comprises a flat bar 41, the outer face 42 of which is finished and a removable tooth carrying bar 43 which is attached to the bar 41 in any suitable manner such as by the cap screws 44 so that the bar 43 may be replaced without removing entire cutter bar structure from the comminutor.

It will be understood that the invention is not to be limited to the specific construction or arrangement of parts shown, but that they may be widely modified within the invention defined by the claims.

What is claimed is:

1. A comminutor for a sewage channel comprising, a semi-cylindrical bar cage member transversely mounted in said sewage channel provided with a plurality of openings cutting said bar cage member in planes perpendicular to the axis thereof, the concave surface of said bar cage member facing upstream having at least one recess formed therein spaced from the sides of said bar cage and disposed substantially perpendicularly to said openings, a comb removably seated in said recess having cutting and shredding teeth extending upstream of said concave surface of the bar cage member in alignment with said openings, removable means engaging one end of said comb for holding it in said recess, a cutting and shredding arm mounted for oscillation about the axis of said bar cage member and located on the upstream side of said concave surface of the bar cage and having teeth thereon interengaging the teeth of said comb, and driving means for oscillating said cutting and shredding arm over the concave surface of said bar cage.

2. A comminutor for a sewage channel comprising, a semi-cylindrical bar cage member transversely mounted in said sewage channel provided with a plurality of bars and a plurality of openings therebetween each disposed in planes perpendicular to the axis of the bar cage member, the concave surface of said bar cage member facing upstream and having at least one recess formed therein spaced from the sides of said bar cage disposed substantially perpendicularly to said openings, a detachable comb member mounted in said recess, said comb member provided with a cutting and shredding tooth in alignment with each of said openings and extending upstream of the planes of said concave surface, a cutting and shredding arm disposed at an acute angle to the axial line of said comb member, means for oscillating said cutting and shredding arm over the concave surface of said bar cage member, and teeth formed on said cutting and shredding arm located to move over the concave surfaces of the said plurality of bars on the bar cage member for sweeping of the accumulated screenings of the sewage flow in said channel from said concave surfaces towards the comb members and to cut and shred said screenings by interengagement with the teeth of said comb.

3. A comminutor for a sewage channel comprising a semi-cylindrical bar cage member transversely mounted in said sewage channel provided with a plurality of bars and a plurality of slot-like openings therebetween each disposed in planes perpendicular to the axis of the bar cage member, the concave surface of said bar cage member facing upstream and having spaced recesses formed therein at points away from the sides of said bar cage member disposed substantially perpendicularly to said openings, a detachable comb member for each of said recesses, each of said comb members provided with cutting and shredding teeth in alignment with said openings and extending upstream of said concave surface, removable means engaging one end of each of said combs for holding said combs in said recesses, a cutting and shredding arm disposed at an acute angle to the axial line of said comb members, means for oscillating said cutting and shredding arm over the concave surface of said bar cage member, teeth formed on said cutting and shredding arm, the side face of said teeth forming a portion of a cylindrical surface in close clearance with the concave surface of said plurality of bars on the bar cage member for sweeping of the accumulated screenings in the sewage flow in said sewage channel along said concave surface towards the teeth of said comb members, and the lateral faces of said teeth engaging with the teeth of said comb members for cutting and shredding the accumulated screenings.

4. A comminutor to be mounted in a sewage conducting channel including, support columns disposed on either side of said channel perpendicular to the longitudinal line thereof, an arcuate flange connected across said columns at a point remote from the floor of said sewage conducting channel, anchoring means provided between said columns on the floor of said sewage conducting channel, a semi-cylindrical bar cage member transversely disposed in said sewage channel and connected on either side to said columns and disposed between said flange and said anchoring means and having the concave surface thereof facing upstream, said bar cage member provided with a plurality of slotted openings in planes perpendicular to the axis thereof, the concave surface of said bar cage member having spaced recesses at points away from the sides thereof and disposed substantially perpendicular to said openings, comb members for each of said recesses detachably mounted between said anchoring member and said flange and each of said comb members having a cutting and shredding tooth in alignment with each of said slotted openings and extending past the upstream plane of the concave surface of the bar cage member, a cutting and shredding arm located on the upstream side of said bar cage member mounted for oscillation about and at an acute angle to the axis of said bar cage member and having teeth thereon for interengaging with the teeth of said comb members, and means mounted on said support columns for oscillating said cutting and shredding arm.

5. A comminutor as claimed in claim 4 wherein the means for detachably mounting the comb members includes, the flange provided with bores therethrough and the anchoring means having sockets therein in the axial line of each of said recesses, said combs being smaller in diameter than said bores and mounted therethrough in said recesses, the lower ends of said combs adapted to fit said sockets, sleeves removably mounted in said bores to snugly engage the upper end of said combs to adjustably position them in said recesses so that the teeth of the cutting and shredding arm will interengage the teeth of said comb.

HERBERT J. MEEKER.

REFERENCES CITED

The following references are of record in the file of this patent:

UNITED STATES PATENTS

| Number | Name | Date |
| --- | --- | --- |
| 1,097,460 | Neuman | May 19, 1914 |
| 1,960,303 | Durdin | May 29, 1934 |
| 2,003,150 | Knight | May 28, 1935 |
| 2,261,090 | Lind | Oct. 28, 1941 |
| 2,305,935 | Thom | Dec. 22, 1942 |
| 2,389,306 | Green | Nov. 20, 1945 |
| 2,391,704 | Hughes | Dec. 25, 1945 |

FOREIGN PATENTS

| Number | Country | Date |
| --- | --- | --- |
| 147,681 | Austria | Nov. 10, 1936 |